US012177545B2

(12) United States Patent
Chen

(10) Patent No.: US 12,177,545 B2
(45) Date of Patent: Dec. 24, 2024

(54) ELECTRONIC DEVICE AND FUNCTIONAL MODULE THEREOF

(71) Applicant: VIVO MOBILE COMMUNICATION CO., LTD., Dongguan (CN)

(72) Inventor: Donglin Chen, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 315 days.

(21) Appl. No.: 17/949,197

(22) Filed: Sep. 20, 2022

(65) Prior Publication Data

US 2023/0013000 A1 Jan. 19, 2023

Related U.S. Application Data

(63) Continuation of application No. PCT/CN2021/082370, filed on Mar. 23, 2021.

(30) Foreign Application Priority Data

Mar. 23, 2020 (CN) .......................... 202010209076.0

(51) Int. Cl.
*H04N 23/51* (2023.01)
*G06F 1/16* (2006.01)
(Continued)

(52) U.S. Cl.
CPC ............ *H04N 23/51* (2023.01); *G06F 1/1686* (2013.01); *H04M 1/0264* (2013.01); *H04N 23/55* (2023.01); *H04N 23/60* (2023.01)

(58) Field of Classification Search
CPC ........ H04N 23/51; H04N 23/60; H04N 23/55; G06F 1/1686; H04M 1/0264
(Continued)

(56) References Cited

U.S. PATENT DOCUMENTS 8,161,681 B2 * 4/2012 Treihaft ................. E05F 15/63
49/141
10,530,982 B2 * 1/2020 Daulton ................. H04N 23/69
(Continued)

FOREIGN PATENT DOCUMENTS

CN 105813426 A 7/2016
CN 207968581 U 10/2018
(Continued)

OTHER PUBLICATIONS

Extended European Search Report issued in related European Application No. 21776276.4, mailed Jun. 19, 2023, 10 pages.
(Continued)

*Primary Examiner* — Matthew David Kim
(74) *Attorney, Agent, or Firm* — IPX PLLC

(57) ABSTRACT

An electronic device and a functional module are provided. The electronic device includes a body and a functional module. The body has a first installation space, and a second limiting portion is disposed in the first installation space. The functional module includes a functional component and a drive apparatus. The drive apparatus is connected to the functional component. The drive apparatus includes an output shaft. The output shaft is connected to a first limiting portion, and the output shaft drives the first limiting portion to rotate between a first position and a second position. In a case that the first limiting portion is in the first position, the first limiting portion is fitted with the second limiting portion to restrict detachment of the functional module from the first installation space.

15 Claims, 6 Drawing Sheets

(51) Int. Cl.
*H04M 1/02* (2006.01)
*H04N 23/55* (2023.01)
*H04N 23/60* (2023.01)

(58) Field of Classification Search
USPC .................................................... 348/38
See application file for complete search history.

(56) References Cited

U.S. PATENT DOCUMENTS

| | | | | |
|---|---|---|---|---|
| 2002/0034436 | A1* | 3/2002 | Peterson | H01L 21/67386 |
| | | | | 414/795.3 |
| 2005/0200740 | A1* | 9/2005 | Kim | H04M 1/0264 |
| | | | | 348/E5.025 |
| 2006/0075602 | A1* | 4/2006 | Oh | G06F 1/1622 |
| | | | | 16/297 |
| 2006/0261248 | A1 | 11/2006 | Hwang | |
| 2007/0141920 | A1* | 6/2007 | Mogamiya | G02B 27/646 |
| | | | | 439/752 |
| 2011/0096476 | A1* | 4/2011 | Choi | H04M 1/0216 |
| | | | | 361/679.01 |
| 2012/0219276 | A1* | 8/2012 | Suzuka | H04N 23/685 |
| | | | | 396/55 |
| 2013/0110129 | A1* | 5/2013 | Reid | A61B 34/30 |
| | | | | 403/326 |
| 2015/0356336 | A1 | 12/2015 | Hoobler et al. | |
| 2017/0297738 | A1* | 10/2017 | von Flotow | B64D 1/12 |
| 2018/0352133 | A1* | 12/2018 | Yoneda | H02K 7/06 |
| 2019/0343335 | A1* | 11/2019 | Charopoulos | A47J 43/046 |

FOREIGN PATENT DOCUMENTS

| | | |
|---|---|---|
| CN | 109756599 A | 5/2019 |
| CN | 110519418 A | 11/2019 |
| CN | 209677549 U | 11/2019 |
| CN | 110557470 A | 12/2019 |
| CN | 111314523 A | 6/2020 |
| CN | 111464677 A | 7/2020 |
| EP | 1578113 A1 | 9/2005 |
| JP | H1075287 A | 3/1998 |
| JP | 2001298516 A | 10/2001 |
| JP | 2003281755 A | 10/2003 |
| JP | 2005286497 A | 10/2005 |
| JP | 2011187043 A | 9/2011 |
| WO | 2019228324 A1 | 12/2019 |

OTHER PUBLICATIONS

Notice of Reasons for Refusal issued in related Japanese Application No. 2022-549767, mailed Aug. 29, 2023, 3 pages.
International Search Report issued in corresponding International Application No. PCT/CN2021/082370, mailed Jun. 22, 2021, 6 pages.
First Office Action issued in related Chinese Application No. 202010209076.0 mailed Nov. 2, 2020, 6 pages.

* cited by examiner

ELECTRONIC DEVICE AND FUNCTIONAL MODULE THEREOF

CROSS-REFERENCE TO RELATED APPLICATIONS

This application is a continuation of International Application No. PCT/CN2021/082370, filed on Mar. 23, 2021, which claims priority to Chinese Patent Application No. 202010209076.0, filed on Mar. 23, 2020. The entire contents of each of the above-referenced applications are expressly incorporated herein by reference.

TECHNICAL FIELD

The present disclosure relates to the field of communications device technologies, and in particular, to an electronic device and a functional module thereof.

BACKGROUND

With gradual advancement of the information-based society, an electronic device such as a mobile phone has penetrated people's work and life, which brings great convenience to people. In addition, a camera is usually disposed on the electronic device, to facilitate work such as photographing, video recording, and a video call. However, in a current electronic device, a camera is usually integrated with a body in the electronic. In a photographing process, especially in a self-portrait photographing process, the electronic device needs to be held by hand, thereby limiting a scenario of using a photographing function of the camera. In addition, expansion of other functional components such as a telephone receiver also encounters such problem.

SUMMARY

The present disclosure discloses an electronic device and a functional module thereof.

An electronic device is disclosed, including: a body, where the body has a first installation space, and a second limiting portion is disposed in the first installation space; and a functional module, where the functional module includes a functional component and a drive apparatus, the drive apparatus is connected to the functional component, the drive apparatus includes an output shaft, the output shaft is connected to a first limiting portion, and the output shaft drives the first limiting portion to rotate between a first position and a second position, where in a case that the first limiting portion is in the first position, the first limiting portion is fitted with the second limiting portion to restrict detachment of the functional module from the first installation space; and in a case that the first limiting portion is in the second position, fitting between the first limiting portion and the second limiting portion is released, and the functional module can be detached from the body.

A second aspect of the present disclosure further discloses a functional module, applied to an electronic device. The electronic device includes a body, the body has a first installation space, a second limiting portion is disposed in the first installation space, the functional module is adapted to be installed in the first installation space, and the functional module includes: a functional component; and a drive apparatus, where the drive apparatus is connected to the functional component, the drive apparatus includes an output shaft, the output shaft is connected to a first limiting portion, and the output shaft drives the first limiting portion to rotate between a first position and a second position, where in a case that the first limiting portion is in the first position, the first limiting portion is fitted with the second limiting portion to restrict detachment of the functional module from the first installation space; and in a case that the first limiting portion is in the second position, fitting between the first limiting portion and the second limiting portion is released, and the functional module can be detached from the body.

The present disclosure discloses an electronic device and a functional module thereof. The electronic device has a first installation space in which the functional module can be accommodated, and a second limiting portion is disposed in the first installation space. The functional module includes a functional component, a drive apparatus, and a first limiting portion, where the functional component is connected to the drive apparatus, an output shaft of the drive apparatus is connected to the first limiting portion, and the output shaft may drive the first limiting portion to rotate between a first position and a second position. In addition, when the first limiting portion is in the first position, the first limiting portion is fitted with the second limiting portion, to restrict detachment of the functional module from the first installation space, thereby facilitating carrying of the electronic device. When the first limiting portion is in the second position, a fitting relationship between the first limiting portion and the second limiting portion is released, so that the functional component can be detached from a body. This enables a user to separately grasp the functional module for photographing or the like, and the functional module is not easily limited by a use scenario, thereby expanding an applicable scope of the functional component.

BRIEF DESCRIPTION OF DRAWINGS

The accompanying drawings described herein are intended to provide a further understanding of the present disclosure, and constitute a part of the present disclosure. The illustrative embodiments of the present disclosure and descriptions thereof are intended to describe the present disclosure, and do not constitute limitations on the present disclosure. In the accompanying drawings.

DETAILED DESCRIPTION

Figure 1:
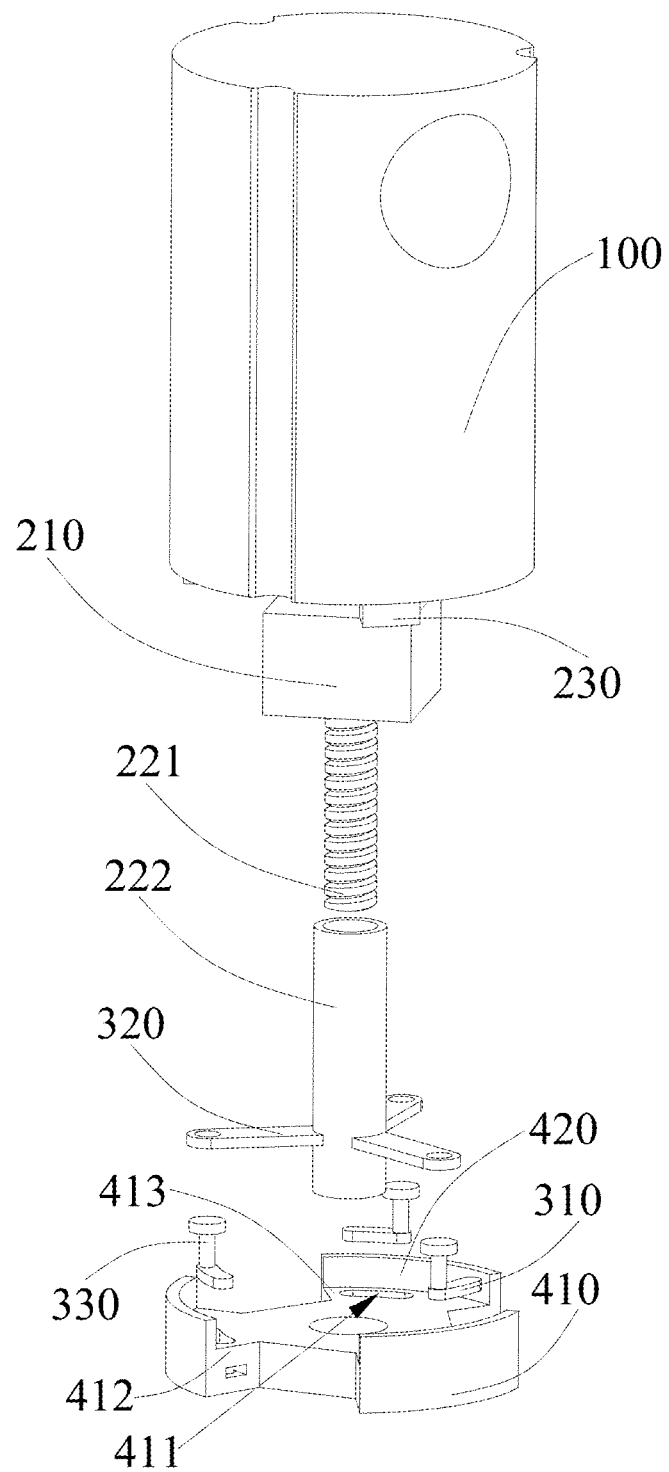
FIG. 1 is an exploded schematic diagram of a functional module disclosed in an embodiment of the present disclosure.

To make the objectives, technical solutions, and advantages of the present disclosure clearer, the following describes the technical solutions of the present disclosure with reference to the embodiments and the corresponding accompanying drawings in the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The following describes in detail the technical solutions disclosed in the embodiments of the present disclosure with reference to the accompanying drawings.

As shown in FIG. 1 to FIG. 9, an embodiment of the present disclosure discloses an electronic device and a functional module thereof, where the functional module includes a functional component 100 and a drive apparatus 200, and the functional component 100 may include at least one of a camera, a fill light, a telephone receiver, a sensor, and a fingerprint recognition module. The electronic device includes a body 500 and the foregoing functional module.

The body 500 has a first installation space 510, and a second limiting portion 520 is disposed in the first installation space 510. The drive apparatus 200 is connected to the functional component 100, the drive apparatus 200 includes an output shaft 221, and the output shaft 221 is connected to a first limiting portion 300. In a working process of the electronic device, the output shaft 221 can drive the first limiting portion 300 to rotate between a first position and a second position.

In a case that the first limiting portion 300 is in the first position, the first limiting portion 300 is fitted with the second limiting portion 520 to restrict detachment of the functional module from the first installation space 510, so that the functional module is installed on the body 500, and is integrated with the body 500, to facilitate carrying of the electronic device. In a case that the first limiting portion 300 is in the second position, a fitting relationship between the first limiting portion 300 and the second limiting portion 520 can be released, so that the functional module can be detached from the body 500. This enables a user to separately grasp the functional module to perform corresponding work. Compared with grasping the entire electronic device, the functional module is not easily limited by a use scenario, thereby expanding an applicable scope of the functional component 100.

It should be noted that the functional module may be connected to the body 500 through a wire, or an energy supply component such as a charging battery may be further disposed in the functional module, to ensure that the functional component 100 in the functional module can still work normally in a case that the functional module is detached from the body 500. Similarly, in a case that the functional module is detached from the body 500, a communication connection relationship may be established between the functional module and the body 500 in a wired or wireless manner or the like. In this way, data may be transmitted between the functional component 100 and the body 500, and in addition, the body 500 can control the functional component 100 to work. In detail, in a case that the functional module is installed in the first installation space 510, the functional component 100 may be controlled by the body 500 to work, and in a case that the functional module is detached from the body 500, the functional component 100 may be controlled by or independent of the body 500 to work.

In some embodiments, a size of the first installation space 510 may be correspondingly set according to an overall size of the functional module. In some embodiments, in a case that the first limiting portion 300 is in the first position, the functional module may be flush with a surface of the body 500, to prevent portability of the electronic device from being reduced by protruding of the functional module relative to the body 500, and may further make an appearance of the electronic device more regular and aesthetic.

In some embodiments, the first limiting portion 300 and the second limiting portion 520 are a fitted clamping structure. For example, both the first limiting portion 300 and the second limiting portion 520 may be fasteners. When the first limiting portion 300 is rotated to the first position, the first limiting portion 300 may be fitted with the second limiting portion 520 to connect the body 500 and the functional module, to restrict detachment of the functional module from the first installation space 510. When the first limiting portion 300 is rotated to the second position, the fitting relationship between the first limiting portion 300 and the second limiting portion 520 may be released, so that the first limiting portion 300 is detached from the second limiting portion 520, and the body 500 can also be detached from the functional module.

In some embodiments, the first limiting portion 300 and the second limiting portion 520 may be respectively a rod-like structure and a hole-like structure. The rod-like structure is rotated and is penetrated into the hole-like structure, or the first limiting portion 300 is fitted with the second limiting portion 520 to restrict motion of the body 500 and the functional module. Correspondingly, the rod-like structure is rotated again to be protruded from the hole-like structure, so that the fitting relationship between the first limiting portion 300 and the second limiting portion 520 can be released.

Figure 3:
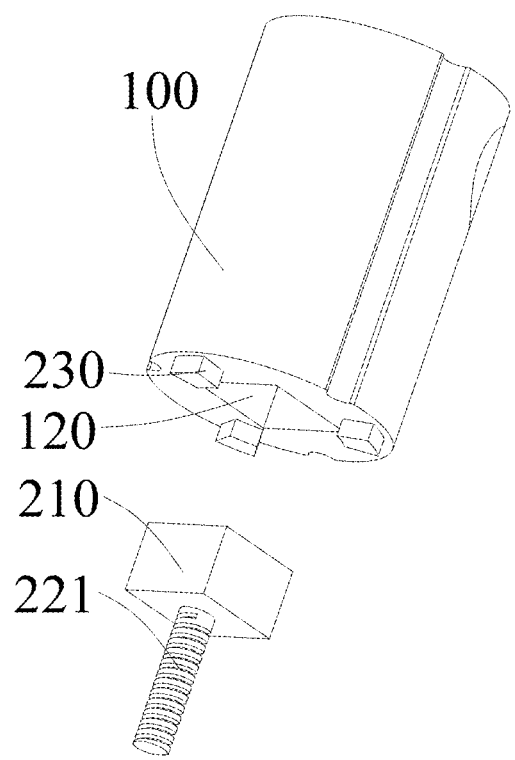
FIG. 3 is a schematic structural diagram of a part of a functional module disclosed in an embodiment of the present disclosure.
Figure 4:
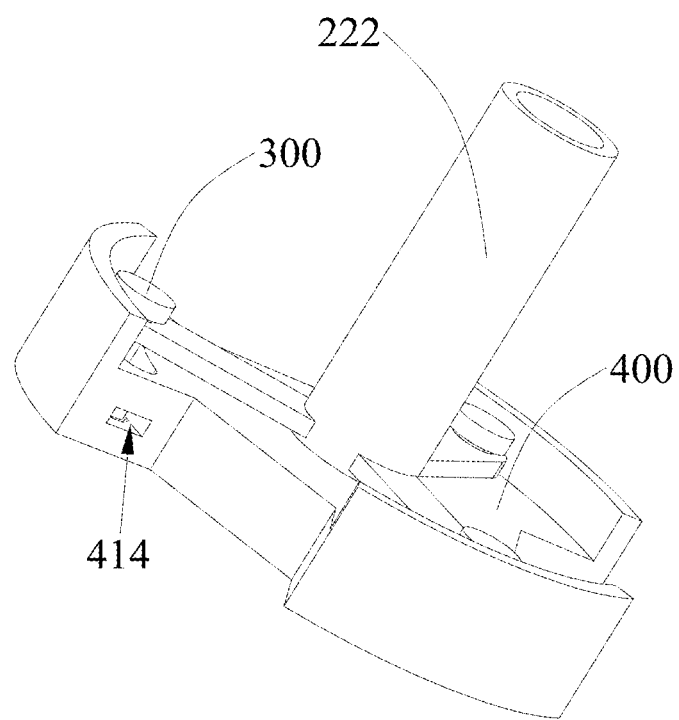
FIG. 4 is a schematic structural diagram of another part of a functional module disclosed in an embodiment of the present disclosure.
Figure 5:
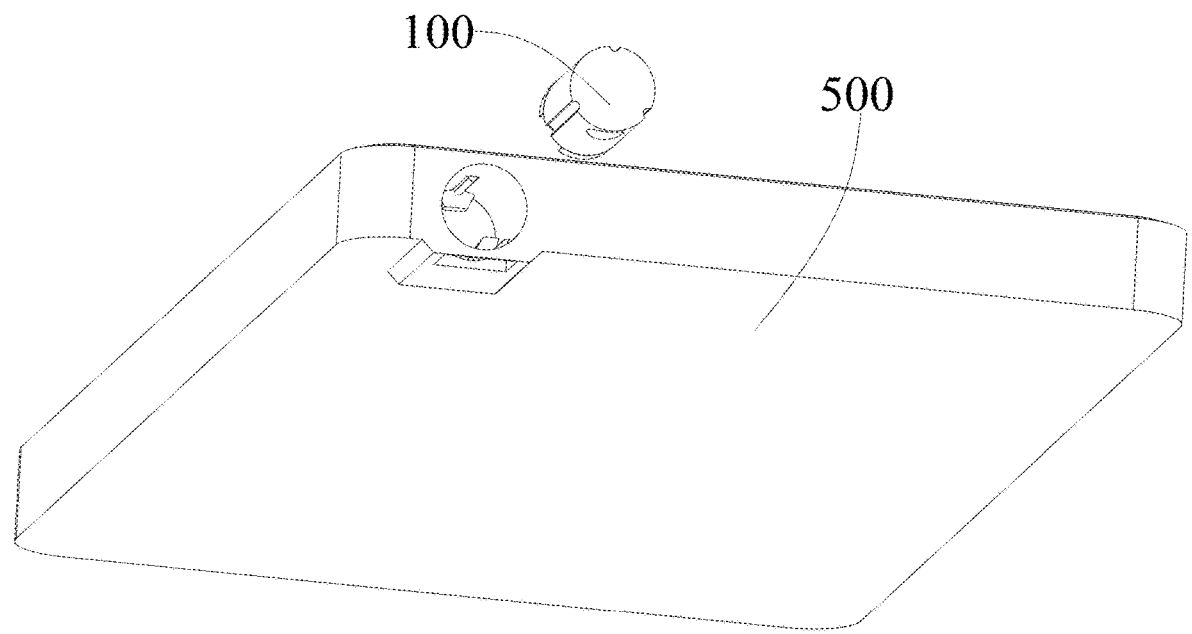
FIG. 5 is an exploded schematic diagram of an electronic device disclosed in an embodiment of the present disclosure.

The drive apparatus 200 may be a component such as a motor, and the drive apparatus 200 may be connected to a power supply in the electronic device, or the drive apparatus 200 may be connected to a charging battery in the functional module. As shown in FIG. 3 and FIG. 4, the drive apparatus 200 may include a drive body 210 and an output shaft 221. The output shaft 221 can rotate relative to the drive body 210, and the functional component 100 may be installed on the drive body 210. The first limiting portion 300 may be directly fixed to the output shaft 221 through bonding or welding; or the first limiting portion 300 may be indirectly installed on the output shaft 221 by using another structure. A motion form between the first limiting portion 300 and the output shaft 221 may be added by using another structure.

Further, there may be a plurality of first limiting portion 300 and a plurality of second limiting portion 520, and the plurality of includes two or more. The plurality of first limiting portions 300 are disposed at intervals in a circumferential direction of the output shaft 221, the plurality of second limiting portions 520 are disposed at intervals in the first installation space 510, the plurality of first limiting portions 300 are a one-to-one correspondence with the plurality of second limiting portions 520, and in a case that the first limiting portion 300 is in the first position, each first limiting portion 300 is in limiting fitting with one corresponding second limiting portion 520.

By using the foregoing structure, reliability of the fitting relationship between the first limiting portion 300 in the first position and the second limiting portion 520 can be further improved. In addition, even if a fitting relationship between a first limiting portion 300 and a corresponding second limiting portion 520 accidentally fails, the functional module is not detached from the first installation space 510. In addition, because the plurality of first limiting portions 300 are disposed at intervals in the circumferential direction of the output shaft 221, in a case that the plurality of first limiting portions 300 are in one-to-one fitting with the plurality of second limiting portions 520, shaking of the functional module relative to the body 500 can be basically prevented, thereby further improving stability of a fitting relationship between the functional module and the body 500.

Further, the plurality of first limiting portions 300 may be disposed uniformly and at intervals in the circumferential direction of the output shaft 221. Correspondingly, a distribution situation of the plurality of second limiting portions 520 corresponds to a distribution situation of the plurality of first limiting portions 300, so that each first limiting portion 300 can be fitted with one corresponding second limiting portion 520. In addition, structures and sizes of the plurality of first limiting portions 300 may be the same, to reduce processing difficulty of the electronic device. In addition, in a case that the plurality of first limiting portions 300 are uniformly disposed, one first limiting portion 300 can be fitted with any one of the plurality of second limiting portions 520, thereby reducing fitting difficulty between the functional module and the body 500 and improving user experience.

In a case that a plurality of first limiting portions 300 and a plurality of second limiting portions 520 are disposed, further, a limiting gap may be formed between two adjacent second limiting portions 520, that is, the two adjacent second limiting portions 520 are disposed at intervals and the limiting gap is clamped.

The functional module may further include a limiting base 400, and the limiting base 400 is rotatably installed on the output shaft 221. The limiting base 400 includes a limiting convex portion. In a case that the first limiting portion 300 is rotated to the first position, the limiting convex portion 410 is located in a limiting gap, and the limiting convex portion 410 is fitted with two adjacent second limiting portions 520, so that the limiting base 400 is in limiting fitting with the second limiting portion 520 in the circumferential direction of the output shaft 221, thereby further improving stability of a fitting relationship between the functional module and the body 500.

In some embodiments, the limiting convex portion 410 and the first limiting portion 300 may be disposed at intervals in the circumferential direction of the output shaft 221. In some embodiments, a part of the first limiting portion 300 may be disposed in the limiting convex portion 410, so that a quantity of limiting convex portions 410 is equal to a quantity of first limiting portions 300, the plurality of first limiting portions 300 and the plurality of second limiting portions 520 are disposed in a one-to-one correspondence, and a limiting gap may be sandwiched between any two adjacent second limiting portions 520 among the plurality of second limiting portions 520, so that a plurality of limiting convex portions 410 are in one-to-one fitting with a plurality of limiting gaps.

Further, a size of the limiting convex portion 410 in an axial direction of the output shaft 221 may be equal to a size of the second limiting portion 520 in the foregoing axial direction, so that in a case that the functional module is installed in the first installation space 510, the limiting convex portion 410 and the second limiting portion 520 may provide a support function for the functional component 100, thereby further improving stability of a fitting relationship between the functional module and the body 500.

As described above, a part of the first limiting portion 300 may be installed in the limiting convex portion 410. In some embodiments, an accommodating space 411 is disposed in the limiting convex portion 410, and a part of the first limiting portion 300 may be accommodated by using the accommodating space 411. To ensure that the first limiting portion 300 can be still fitted with the second limiting portion 520, a perforation 414 or a through groove connected to the accommodating space 411 may be further disposed in the limiting convex portion 410. A part of the first limiting portion 300 is protruded out of the accommodating space through the perforation 414 or the through groove and is fitted with the second limiting portion 520, so that it is ensured that the first limiting portion 300 can still be in the first position to restrict detachment of the functional module from the first installation space 510.

In some embodiments, a direction of rotating the first limiting portion 300 from the first position to the second position may be the same as a direction of rotating the first limiting portion 300 from the second position to the first position. In order to reduce a rotation angle when the first limiting portion 300 is switched between the first position and the second position, in another embodiment of the present disclosure, the direction of rotating the first limiting portion 300 from the first position to the second position may be opposite to the direction of rotating the first limiting portion 300 from the second position to the first position, thereby further improving a response speed of the first limiting portion 300.

Further, as shown in FIG. 1, the limiting convex portion 410 may include a first limiting inner wall 412 and a second limiting inner wall 413, where the first limiting inner wall 412 and the second limiting inner wall 413 are disposed at intervals, and an accommodating space 411 is disposed between the first limiting inner wall 412 and the second limiting inner wall 413.

In a working process of the electronic device, a part of the first limiting portion 300 may be rotated in the accommodating space 411 as the output shaft 221 is rotated. When the first limiting portion 300 is rotated from the second position to the first position, the first limiting portion 300 is fitted with the first limiting inner wall 412, so that the first limiting portion 300 is prevented from being detached from the second limiting portion 520 due to excessive rotation, thereby ensuring that the first limiting portion 300 can form a stable fitting relationship with the second limiting portion 520.

When the first limiting portion 300 is rotated reversely from the first position to the second position, the first limiting portion 300 may be fitted with the second limiting inner wall 413. In a case that there are a plurality of second limiting portions 520, the first limiting portion 300 is prevented from being fitted with the other second limiting portion 520 after being detached from one second limiting portion 520 due to excessive rotation, and consequently, the functional module cannot be normally detached from the body 500.

The first limiting inner wall 412 and the second limiting inner wall 413 are located on two opposite sides of the accommodating space 411, and a part of the first limiting portion 300 needs to be installed in the accommodating space 411. The limiting convex portion 410 may be provided with an installation hole, and the installation hole is connected to the accommodating space 411. The first limiting portion 300 may be protruded out of the accommodating space 411 through the installation hole and is connected to the output shaft 221, so that the first limiting portion 300 can be rotated under driving of the output shaft 221 relative to the limiting convex portion 410. Accordingly, in the circumferential direction of the output shaft 221, the first limiting inner wall 412 and the second limiting inner wall 413 are respectively located on two opposite sides of the installation hole.

In some embodiments, one of the first limiting portion 300 and the second limiting portion 520 may include a fitting portion 310 and the other may be provided with a card slot 521, and in a case that the first limiting portion 300 is in the first position, at least a part of the fitting portion 310 is clamped into the card slot 521 and is fitted with the card slot 521. In a case that the foregoing structure is used for the first limiting portion 300 and the second limiting portion 520, difficulty in forming and releasing the fitting relationship between the first limiting portion 300 and the second limiting portion 520 can be reduced to some extent. In addition, the foregoing structure is also easy to process and easy to assemble.

In some embodiments, the fitting portion 310 may be a straight rod-like structural member. In some embodiments, the fitting portion 310 may be an arc-like structural member, and the fitting portion 310 may extend in a circumferential direction of the output shaft 221. In a case that the foregoing structure is used for the fitting portion 310, the card slot 521 may also be formed by extending in the circumferential direction of the output shaft 221. The card slot 521 in the foregoing structure is more prone to form a fitting relationship with the fitting portion 310. In addition, because a shape of the card slot 521 matches a motion track of the fitting portion 310, a size of the card slot 521 does not need to be too large. Therefore, strength of a structure in which the card slot 521 is formed is relatively large, and deformation does not easily occur.

In some embodiments, in a case that the limiting base 400 is disposed in the functional module, the first limiting portion 300 may include the fitting portion 310, thereby facilitating design and assembly of corresponding components on the functional module and the body 500. In another embodiment, the fitting portion 310 may also be disposed on the second limiting portion 520.

Further, the body 500 includes a power supply, and the functional module includes a charging battery. In a case that at least a part of the fitting portion 310 can be clamped into the card slot 521, the fitting portion 310 may be communicated with a structure having the card slot 521, so that the power supply of the body 500 can form an electrical connection relationship with the charging battery in the functional module, and the charging battery is charged by using the power supply. The functional component 100 is electrically connected to the charging battery, so that it can be ensured that the functional module can work normally in a case that the functional module is detached from the body 500.

In some embodiments, the first limiting portion 300 may include the fitting portion 310, the first limiting portion 300 may be made of a conductive material, and the first limiting portion 300 is connected to the charging battery. The card slot 521 is located on the second limiting portion 520, and the second limiting portion 520 is made of a conductive material such as metal, or a metal connector is additionally disposed in the card slot 521, so that it can be ensured that the first limiting portion 300 clamped into the card slot 521 can be connected to the power supply, and the charging battery is charged by using the power supply.

In some embodiments, as shown in FIG. 1, the first limiting portion 300 may include a fitting portion 310 and a connection portion 320. In a case that the fitting portion 310 extends in a circumferential direction of the output shaft 221, the fitting portion 310 and the output shaft 221 are disposed at intervals in a radial direction of the output shaft 221, and the fitting portion 310 is connected to the output shaft 221 through the connection portion 320, so that it can be ensured that the fitting portion 310 can be rotated as the output shaft 221 rotates. In a case that the first limiting portion 300 is rotated to the first position, it is ensured that the fitting portion 310 can be normally fitted with the second limiting portion 520 to restrict detachment of the functional module from the first installation space 510.

In some embodiments, sizes of the fitting portion 310 and the connection portion 320 may be selected according to an actual situation such as a position of the second limiting portion 520. This is not limited herein. In some embodiments, the connection portion 320 may extend in the radial direction of the output shaft 221. In this case, the connection portion 320 and the fitting portion 310 are flush with each other, and both are located on a periphery of the output shaft 221.

Further, in a case that a part of a structure of the first limiting portion 300 is installed on the limiting base 400, the limiting base 400 may be rotatably installed on an end of the output shaft 221, and the connection portion 320 may be connected to a middle of the output shaft 221, so that the connection portion 320 is located between the limiting base 400 and the drive body 210. In a case that the connection portion 320 is located outside the limiting base 400, there is no need to set an active space for the connection portion 320 on the limiting base 400, thereby reducing a processing step and reducing processing difficulty.

In some embodiments, the connection portion 320 is disposed obliquely relative to the output shaft 221, so that the fitting portion 310 can be located on one side that is of the connection portion 320 and that is away from the drive body 210, and the connection portion 320 can be located outside the limiting base 400. The accommodating space 411 is disposed on the limiting base 400, at least a part of the fitting portion 310 may be accommodated in the accommodating space 411, and an installation hole may be formed on the limiting base 400, so that one of the fitting portion 310 and the connection portion 320 can be connected to the other through the installation hole.

In some embodiments, the connection portion 320 may further extend in the radial direction of the output shaft 221. In this case, to ensure that the connection portion 320 can be located outside the limiting base 400, the first limiting portion 300 may further include a connection post 330, the connection post 330 extends along an axial direction of the output shaft 221, the fitting portion 310 is located on one side that is of the connection portion 320 and that is away from the drive body 210, and the fitting portion 310 is connected to the connection portion 320 through the connection post 330. When the connection post 330 of the foregoing structure is connected to the fitting portion 310 and the connection portion 320, an axial direction of the installation hole that needs to be formed on the limiting base 400 is the same as the axial direction of the output shaft 221, and a shape of the installation hole is regular, thereby facilitating processing.

In some embodiments, the connection post 330 and the fitting portion 310 may be formed through integrated molding, thereby reducing a connection step between components. In addition, a size of the installation hole may be slightly greater than a size of the fitting portion 310 in a corresponding direction, so that the fitting portion 310 can be installed in the installation hole from outside the installation hole.

As described above, the first limiting portion 300 (and the limiting base 400) may be directly connected to the output shaft 221 in a fastening manner, or may be indirectly installed on the output shaft 221 by using another component. In some embodiments, the output shaft 221 may be a threaded shaft, the output shaft 221 is connected to the first limiting portion 300 by using a threaded sleeve rod 222, the threaded sleeve rod 222 is sleeved on the output shaft 221 and is in threaded fitting with the output shaft 221, and the first limiting portion 300 is connected to the threaded sleeve rod 222. The body 500 is provided with a first opening connected to the first installation space 510. In a case that the first limiting portion 300 is in the first position, the functional component 100 may move with rotation of the output shaft 221, so that at least a part of the functional component 100 is protruded out of the first installation space 510 through the first opening.

In some embodiments, in a case that the output shaft 221 is indirectly connected to the first limiting portion 300 through the threaded sleeve rod 222, a direction of rotating the first limiting portion 300 from the first position to the second position is opposite to a direction of rotating the first limiting portion 300 from the second position to the first position, and because there is a friction force between the output shaft 221 and the threaded sleeve rod 222, a priority of an action of the first limiting portion 300 is greater than a priority of an action of the threaded sleeve rod 222.

As shown in FIG. 1, the first limiting portion 300 may be rotated forward from the second position to the first position. In this case, because the first limiting portion 300 is fitted with the second limiting portion 520, even if the output shaft 221 continues to rotate forward, the first limiting portion 300 cannot continue to be rotated forward with the output shaft 221. In this case, when the output shaft 221 continues to rotate forward, the output shaft 221 may interact with the threaded sleeve rod 222, so that a rotation motion of the output shaft 221 can be converted into a straight motion. In addition, a thread of the threaded sleeve rod 222 is designed, and in a case that the output shaft 221 continues to rotate forward, the output shaft 221 may move in an axial direction of the output shaft 221 away from the threaded sleeve rod 222. Because the functional component 100 is connected to the drive body 210, driven by the output shaft 221, the functional device 100 can move in the axial direction of the output shaft 221 and at least part of the functional component 100 is protruded out of the first installation space 510 through the first opening.

In a case that the foregoing structure is used and the functional module and the body 500 are connected to each other, at least a part of the functional component 100 can be still protruded out of the first installation space 510, so that manners of using the electronic device are more diversified, to apply more use scenarios. For example, in a case that the functional component 100 is a telephone receiver, the functional component 100 is protruded out of the first installation space 510, and a relative position between the functional component 100 and the body 500 may be changed, so that the telephone receiver is closer to an ear of the user, and it is ensured that users with different face lengths can obtain better call experience, privacy protection, and the like. In some embodiments, the functional component 100 may be a camera, and at least a part of the functional component 100 is protruded out of the first installation space 510, so that the camera can be used as a camera of the electronic device, and the camera is located outside the body 500, and has a relatively large view range.

In a case that the output shaft 221 is indirectly connected to the first limiting portion 300 through the threaded sleeve rod 222, the limiting base 400 may also be in rotation fitting with the output shaft 221 through the threaded sleeve rod 222. A depth at which the output shaft 221 is penetrated into the threaded sleeve rod 222, so that the limiting base 400 can be in contact with the functional component 100. As described above, in a case that the connection portion 320 of the first limiting portion 300 is located between the fitting portion 310 and the drive body 210, for example, as shown in FIG. 1, the limiting base 400 may further include a limiting edge 420, and the limiting edge 420 is connected to one side that is of the limiting convex portion 410 and that faces the drive body 410, so that an installation space can be formed between the limiting convex portion 410 and the functional component 100, and the connection portion 320 can be installed in the foregoing installation space.

Further, as shown in FIG. 3, a limiting block 230 may be further disposed on the functional module, the limiting block 230 may be fixed on one side that is of the functional component 100 and that faces the limiting base 400, and the limiting block 230 may also be located in the installation space between the limiting convex portion 410 and the functional component 100. When the limiting edge 420 is in contact with the functional component 100 in the axial direction of the output shaft 221, the limiting block 230 may be fitted with the limiting edge 420 to limit each other in the radial direction of the output shaft 221. According to the foregoing technical solution, if the functional module is used alone, interaction between the limiting block 230 and the limiting edge 420 can prevent a radial force generated between the functional component 100 and the limiting base 400 from being directly acted on the output shaft 221 and the threaded sleeve rod 222, and the output shaft 221 and the threaded sleeve rod 222 are bent or even broken by a radial shear force.

In some embodiments, a quantity of limiting edges 420 may be the same as a quantity of limiting blocks 230, and are in a one-to-one correspondence. In addition, a chamfered structure may be formed on the limiting block 230, thereby reducing difficulty when the limiting block 230 is fitted with the limiting edge 420.

In some embodiments, structures of the first installation space 510 and the functional component 100 are the same, and are prism-like structures. For example, the first installation space 510 and the functional component 100 may be a triangular prism, a quadruple prism, or a pentagonal prism. In this case, the functional component 100 and the first installation space 510 may limit each other in the circumferential direction of the output shaft 221, so that in a case that the first limiting portion 300 is fitted with the second limiting portion 520, if the output shaft 221 continues to rotate, under a limiting action of the limit of the first installation space 510, the functional component 100 may move linearly only in the axial direction of the output shaft 221, and at least a part of the functional component 100 is protruded out of the first installation space 510.

In a case that the functional component 100 is a component such as a telephone receiver or a camera, and the foregoing technical solution is used, because the functional component 100 only moves linearly in a protruding process, it can be ensured that an orientation of the functional component 100 before and after the protruding process remains unchanged. Therefore, in a process in which the user uses the functional component 100, the orientation of the functional component 100 does not need to be additionally determined for a plurality of times, thereby facilitating use by the user. It should be noted that the orientation of the functional component 100 is an orientation of a main structure of the functional component 100. For example, when the functional component 100 is a telephone receiver, the orientation of the functional component 100 may be an orientation of a sound amplification month in the telephone receiver, and when the functional component 100 is a camera, the orientation of the functional component 100 may be an orientation of a lens in the camera.

Further, with continuous rotation of the output shaft 221, in a case that lengths of the output shaft 221 and the threaded sleeve rod 222 is sufficient, the functional component 100 may continue to move outside the first installation space 510. When the functional component 100 is wholly outside the first installation space 510, a limiting relationship between the functional component 100 and the first installation space 510 in the circumferential direction of the output shaft 221 is released. In this case, if the output shaft 221 continues to rotate in the foregoing direction, the functional component 100 may rotate with rotation of the output shaft 221, thereby changing the orientation of the functional component 100. This can further expand an applicable scope of the functional component 100.

For example, in a case that the functional component 100 is a camera, because the functional component 100 is located outside the first installation space 510, a view range of the camera can be greatly improved by changing the orientation of the functional component 100. In addition, when a panoramic photo is photographed, in the foregoing solution, the user can obtain the panoramic photo without manually rotating the electronic device. In addition, the functional component 100 is respectively directed toward a side on which a display module of the electronic device is located or a side on which a rear cover of the electronic device is located, so that the functional component 100 can serve as a front camera of the electronic device, and can also serve as a rear camera of the electronic device. Therefore, the front camera and the rear camera may not be additionally disposed in the electronic device. In this way, a screen-to-body ratio can be improved, a quantity of components in the electronic device can be reduced, and further, a degree of integration of the rear cover of the electronic device can be increased.

Figure 2:
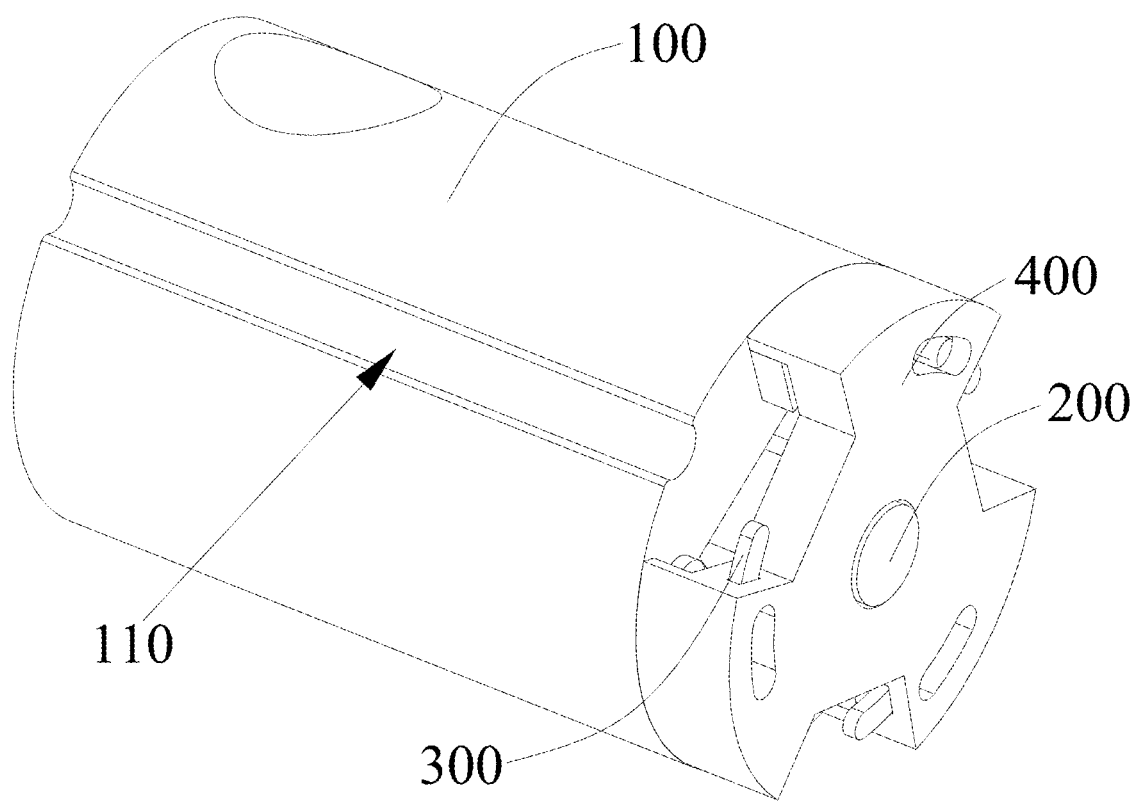
FIG. 2 is a schematic structural diagram of a functional module disclosed in an embodiment of the present disclosure.

Considering that the functional module disclosed in this embodiment of the present disclosure may be further detached from the body 500 as a separate device, to increase a quantity and a size of components that can be installed in the functional module, as shown in FIG. 2, in another embodiment of the electronic device disclosed in the present disclosure, the functional component 100 may be a cylindrical structure, so that a volume of the functional component 100 can be greatly expanded in a case that a size of the functional component 100 is slightly enlarged. In addition, in a case that the functional component 100 is a cylindrical structure, a contact area during grasping of the user, to prevent the functional module from falling when the functional module is used alone. In addition, a feeling when the user grasps the functional module can be further improved to some extent.

Correspondingly, in a case that the functional component 100 is a cylindrical structure, the first installation space 510 may also be a cylindrical structure, and a radius of the first installation space 510 may be slightly greater than a radius of the functional component 100, to ensure that the functional component 100 can be installed in the first installation space 510, so that a gap between the functional component 100 and the first installation space 510 is as small as possible, and external impurities are prevented from entering the electronic device. In addition, a waterproof ring may be further added to the functional component 100 and the first installation space 510, to further improve air tightness of the electronic device.

As described above, the output shaft 221 drives the first limiting portion 300 and the second limiting portion 520 to continue to rotate after the first limiting portion 300 is fitted with the second limiting portion 520, so that at least a part of the functional component 100 can be protruded out of the first installation space 510. It should be noted that if both the functional component 100 and the first installation space 510 are cylindrical structures, in a process in which the functional component 100 is protruded out of the first installation space 510, the functional component 100 may rotate relative to the body 500 as the output shaft 221 rotates.

Based on the foregoing embodiment, in order that the functional component 100 of the cylindrical structure cannot rotate relative to the body 500 when moving in the axial direction of the output axis 221, for example, a guide protrusion 530 may be disposed on one of an inner wall of the first installation space 510 and the functional component 100 and a guide groove 110 may be disposed on the other, both the guide protrusion 530 and the guide groove 110 may extend in the axial direction of the output shaft 221, and the guide protrusion 530 can be fitted in the guide groove 110 to restrict rotation of the functional component 100 in the circumferential direction of the output shaft 221.

If the guide protrusion 530 is disposed on the functional component 100, the guide protrusion 530 may be worn in a process in which the functional component 100 is used alone, and consequently the guide protrusion 530 may not continue to be fitted with the guide groove 110. Therefore, as shown in FIG. 2, the guide groove 110 may be disposed on the functional component 100. Correspondingly, as shown in FIG. 7, the guide protrusion 530 may be disposed in the first installation space 510, and the guide protrusion 530 may be fixed on the body 500.

Based on the foregoing embodiment, in a case that the first limiting portion 300 is fitted with the second limiting portion 520, the output shaft 221 continues to rotate, and the guide protrusion 530 is fitted with the guide groove 110, so that the functional component 100 can move linearly in the axial direction of the output shaft 221, and at least a part of the functional component 100 is protruded out of the first installation space 510.

Because sizes of the guide protrusion 530 and the guide groove 110 in the axial direction of the output shaft 221 are limited, as the functional component 100 continuously moves in the axial direction of the output shaft 221, a fitting relationship between the guide protrusion 530 and the guide groove 110 eventually fails. When the guide protrusion 530 is no longer fitted with the guide groove 110, the functional component 100 can rotate relative to the body 500 with rotation of the output shaft 221, and change the orientation of the functional component 100.

Figure 7:
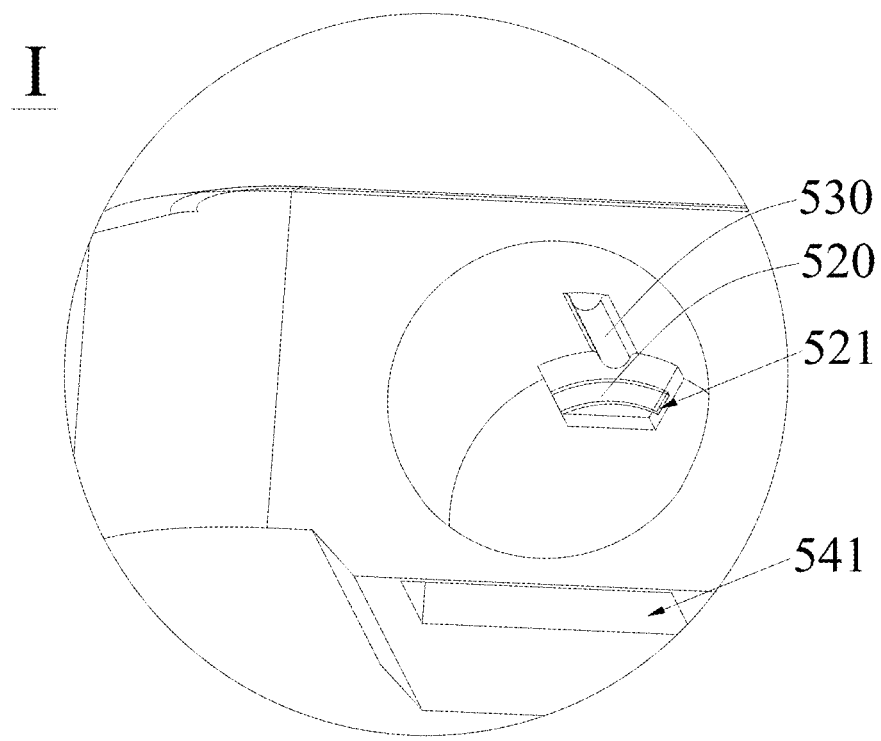
FIG. 7 is an enlarged schematic diagram of a part I in FIG. 6.

Further, in a case that the guide protrusion 530 is located in the first installation space 510, as shown in FIG. 7, there may be a preset spacing between the guide protrusion 530 and the first opening in the axial direction of the output shaft 221. A size of the preset spacing may be determined according to an actual situation of the functional component 100. For example, when the functional component 100 moves to the end of the guide protrusion 530, a structure such as a lens or a loudspeaker of the functional component 100 may be protruded out of the first installation space 510, so that in a process in which the functional component 100 is rotated as the output shaft 221 rotates, an applicable scope of the functional component 100 can be expanded.

When the foregoing technical solution is used and the guide protrusion 530 is no longer fitted with the guide groove 110, a part of the structure of the functional component 100 may still be located in the first installation space 510, so that the body 500 can provide a limiting function and a support function for the functional component 100, to prevent the functional component 100 from being connected to the body 500 only through the rod-like structures such as the output shaft 221 and the threaded sleeve rod 222. However, when the electronic device is inclined, the functional component 100 is skewed relative to the body 500, and a radial shear force received by the output shaft 221 and the threaded sleeve rod 222 when the electronic device is inclined can be reduced, thereby ensuring a relatively high service life of the output shaft 221 and the threaded sleeve rod 222, and further improving a service life of the electronic device.

In some embodiments, as shown in FIG. 3, the functional component 100 may be provided with a second installation space 120 and a second opening connected to the second installation space 120, and the drive body 210 of the drive apparatus 200 may be installed in the second installation space 120, so that a protection function is provided for the drive body 210 through the functional component 100.

In some embodiments, the drive body 210 may be fixed in the second installation space 120 through bonding or the like, or the drive body 210 may be installed on the functional component 100 through a screwed connection member. In some embodiments, the second installation space 120 and the drive body 210 may have a same appearance and are all of a prism-like structure. Therefore, in a process of rotating the output shaft 221, the functional component 100 is fitted with the drive body 210 in the circumferential direction of the output shaft 221, to prevent a case in which the functional component 100 and the drive body 210 skid from affecting normal working of the electronic device.

Figure 6:
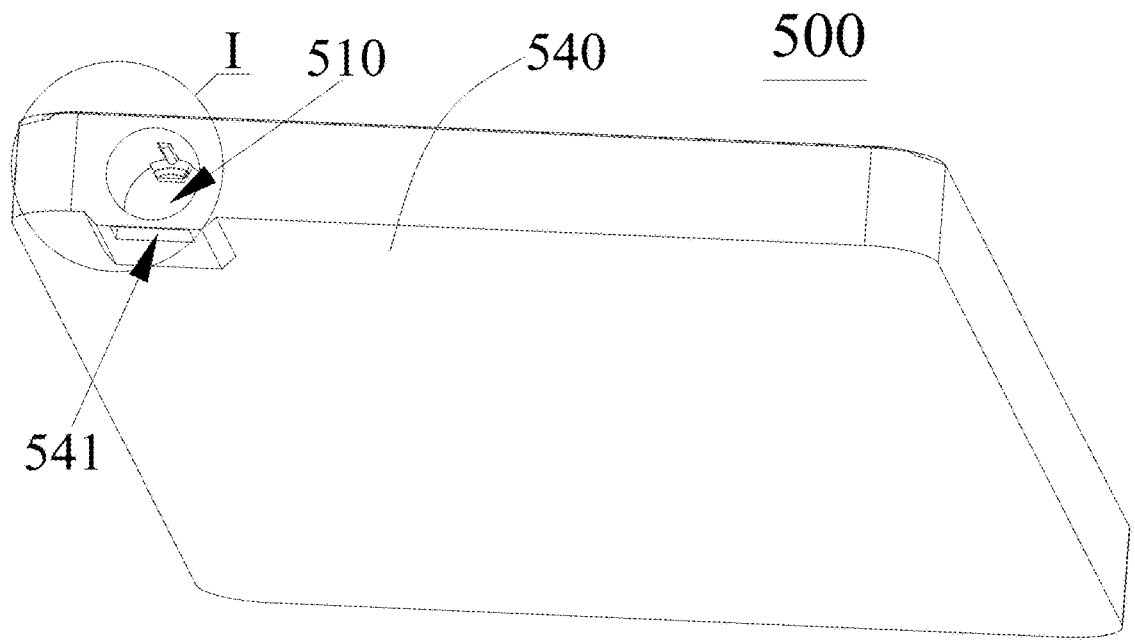
FIG. 6 is a schematic structural diagram of a body in an electronic device disclosed in an embodiment of the present disclosure.
Figure 8:
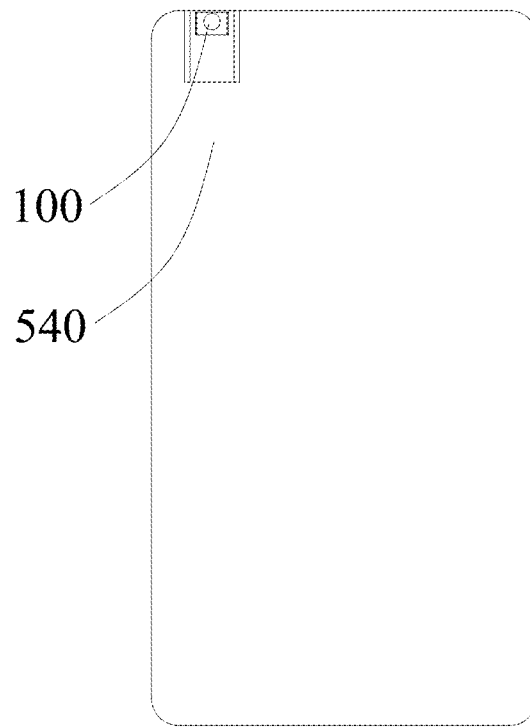
FIG. 8 is a schematic structural diagram of an electronic device disclosed in an embodiment of the present disclosure.
Figure 9:
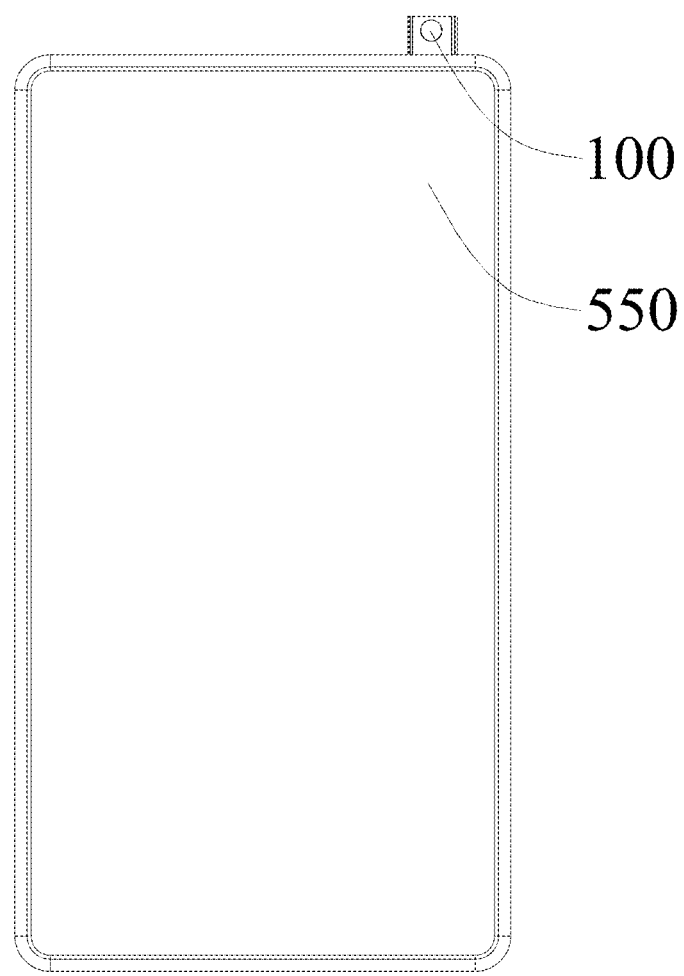
FIG. 9 is a schematic diagram of an electronic device in another direction disclosed in an embodiment of the present disclosure.

Further, the functional component 100 may be an optical component such as a camera. In this case, as shown in FIG. 8 and FIG. 9, the body 500 may include a rear cover 540 and a display screen 550, and the rear cover 540 is disposed opposite to the display screen 550. As shown in FIG. 6, the rear cover 540 is provided with a translucent structure 541, and in a case that the first limiting portion 300 is in the first position, the functional component 100 faces the translucent structure 541, so that the functional module can work normally in a case that the functional module is installed in the first installation space 510, and can serve as a rear camera of the electronic device.

In some embodiments, the translucent structure 541 may be a through hole, so that the through hole faces the functional component 100, and the functional component 100 can obtain an image outside the electronic device. To improve a sealing property of the electronic device, a translucent cover plate may be disposed on the through hole, and the translucent cover plate may be made of a hard transparent material such as a tempered glass, to ensure that the translucent cover plate has relatively high structural strength.

In another embodiment of the present disclosure, when the functional component 100 is an optical component such as a camera, a translucent structure may be further formed on a side on which the display module of the electronic device is located, or a translucent structure may be formed on a side between the display module and the rear cover. An orientation of the functional module when the functional module is installed in the first installation space 510 is changed, so that the functional module can serve as a front camera or a side camera when being located in the first installation space 510.

As described above, a charging battery may be disposed in the functional module, to further reduce restriction on the use of the functional device 100 alone. In a case that one of the first limiting portion 300 and the second limiting portion 520 includes the fitting portion 310 and the other includes the card slot 521, the power supply on the body 500 may charge the charging battery through fitting between the fitting portion 310 and the card slot 521.

In a case that the functional module includes the charging battery, the body 500 may further include a wireless charging coil, and in a case that the first limiting portion 300 is in the first position, the charging battery may be fitted with the wireless charging coil to charge the charging battery.

In some embodiments, the functional module may include a first charging contact, the first charging contact is electrically connected to the charging battery, a second charging contact may be disposed in the first installation space 510, and in a case that the first limiting portion 300 is in the first position, the first charging contact is in electrical contact with the second charging contact, so that the power supply can charge the charging battery.

For another example, a charging connector may be disposed in one of the first installation space 510 and the functional module and a charging interface may be disposed in the other, and in a case that the first limiting portion 300 is in the first position, the charging connector is plugged and electrically connected to the charging interface, so that it can also be ensured that the power supply can charge the charging battery.

Based on the foregoing plurality of embodiments, an operation process of the electronic device disclosed in the present disclosure is as follows:

First, the functional module may be installed in the first installation space 510, and the functional component 100 faces the translucent structure 541 on the rear cover 540, so that the functional component 100 can serve as a rear camera of the electronic device. In addition, the output shaft 221 is rotated forward, and the first limiting portion 300 is driven to be fitted with the second limiting portion 520 to restrict detachment of the functional module from the first installation space 510, thereby ensuring a stable fixing relationship between the functional module and the body 500.

Then, the output shaft 221 continues to rotate forward, so that at least a part of the functional component 100 can be protruded out of the first installation space 510 through the first opening under the fitting between the guide protrusion 530 and the guide groove 110. Because the functional component 100 only moves linearly in a protruding process, the orientation of the functional component 100 can remain unchanged, and the functional component 100 still faces the side on which the rear cover 540 in the electronic device is located. In this case, a view range of the functional component 100 is no longer limited by the body 500, and the view range of the functional component 100 can be expanded. In addition, the first limiting portion 300 is still fitted with the second limiting portion 520, and a part of the structure of the functional component 100 is still located in the first installation space 510, so that a relative fixed relationship between the functional component 100 and the body 500 is still relatively stable, and the functional component 100 works normally as a rear camera of the electronic device.

When the functional component 100 moves to the end of the guide protrusion 530, a fitting relationship between the guide protrusion 530 and the guide groove 110 fails. In some embodiments, the output shaft 221 continues to rotate forward, so that the functional component 100 rotates forward along with the output shaft 221. In a rotation process of the functional component 100, the output shaft 221 is controlled to stop rotating, so that the functional component 100 hovers to any angle toward the electronic device, to perform photographing at an angle toward the functional component 100. Correspondingly, when the functional component 100 rotates to the side on which the display module of the electronic device is located, the functional component 100 may serve as a front camera of the electronic device.

When the functional component 100 moves to the end of the guide protrusion 530, a part of the functional component 100 is located outside the first installation space 510. In some embodiments, the output shaft 221 may further rotate reversely. Because of a friction force between the threaded sleeve rod 222 and the output shaft 221, the output shaft 221 drives the first limiting portion 300 to rotate from the first position to the second position, thereby releasing the fitting relationship between the first limiting portion 300 and the second limiting portion 520, so that the functional module can be detached from the body 500. In this case, the user may remove the whole functional module from the first installation space 510 by grasping a part that is of the functional component 100 and that is located outside the first installation space 510, and operation difficulty of this removal manner is relatively low. After the functional module is removed, the functional module may be used as a separate device to perform photographing, and the functional module is not easily limited by a use scenario, so that an applicable scope of the electronic device can be expanded. In addition, when the functional module is detached from the body 500 and is used alone, the position of the first limiting portion 300 is limited, and the output shaft 221 is rotated reversely, so that the output shaft can be retracted into the threaded sleeve rod 222, and the limiting base 400 is in contact with the functional component 100, thereby reducing a size of the entire functional module in the axial direction of the output shaft 221 and facilitating use by the user.

When the functional module needs to be installed back into the first installation space 510, the output shaft 221 may be rotated reversely first, to ensure that the first limiting portion 300 is in a retracted state. Then, the functional component 100 faces a direction of the rear cover 540, and the functional module is installed in the first installation space 510. The limiting convex portion 410 in the limiting base 400 is located between two second limiting portions 520, so that it can be determined that the functional module is aligned with the second limiting portion 520. Then, the output shaft 221 continues to rotate reversely. Because the first limiting portion 300 and the second limiting inner wall 413 in the limiting convex portion 410 perform limiting, the output shaft 221 can be fitted only with the threaded sleeve rod 222, and under a limiting action of the guide protrusion 530 and the guide groove 110, the output shaft 221 continuously rotates reversely, so that the functional component 100 can be driven to move linearly and retract to the first installation space 510. When the functional component 100 cannot continue to move into the first installation space 510, the output shaft 221 is controlled to rotate forward, to drive the first limiting portion 300 to rotate forward. When the first limiting portion 300 and the first limiting inner wall 412 in the limiting base 400 perform limiting, it may be determined that the first limiting portion 300 is in the first position. In this case, the first limiting portion 300 is fitted with the second limiting portion 520 to restrict detachment of the functional module from the first installation space 510, thereby ensuring that the functional module can form a stable relative fixed relationship with the body 500.

The electronic device disclosed in this embodiment of the present disclosure may be a smartphone, a tablet computer, an e-book reader, or a wearable device; The electronic device may be another device. This is not limited in this embodiment of the present disclosure.

The present disclosure further discloses a functional module, and the functional module may be the functional module in the foregoing electronic device.

That is, the functional module may be installed on the electronic device. The electronic device includes a body 500, the body 500 has a first installation space 510, a second limiting portion 520 is disposed in the first installation space 510, the functional module in this embodiment of the present disclosure is adapted to be installed in the first installation space 510, and the functional module includes a functional component 100 and a drive apparatus 200, where the drive apparatus 200 is connected to the functional component 100, the drive apparatus 200 includes an output shaft 221, the output shaft 221 is connected to a first limiting portion 300, and the output shaft 221 drives the first limiting portion 300 to rotate between a first position and a second position.

In a case that the first limiting portion 300 is in the first position, the first limiting portion 300 is fitted with the second limiting portion 520, to restrict detachment of the functional module from the first installation space 510. In a case that the first limiting portion 300 is in the second position, fitting between the first limiting portion 300 and the second limiting portion 520 is released, and the functional module can be detached from the body 500.

In view of the foregoing detailed descriptions of the structural composition and the connection relationship of the functional module, details are not described herein again.

It can be understood that the functional component 100 in the functional module in this embodiment of the present disclosure may work independently, or may be controlled by the body 500 of the electronic device to work, and therefore there are a plurality of working manners. In addition, the functional module may be installed on the body 500 of the electronic device or may be detached from the body 500, and therefore a connection manner is flexible, and can meet a plurality of use requirements. In a case that the functional component 100 includes a camera, the functional module adapts to a plurality of photographing scenarios, so that photographing experience of a user can be improved.

The foregoing embodiments of the present disclosure focus on describing differences between the embodiments, and different optimization features of the embodiments may be combined to form better embodiments provided that they are not contradictory. For brevity, details are not described herein again.

The foregoing descriptions are merely the embodiments of the present disclosure, and are not intended to limit the present disclosure. For a person skilled in the art, various variations and changes may be made in the present disclosure. Any modification, equivalent replacement, or improvement made without departing from the spirit and principle of the present disclosure shall fall within the scope of the claims in the present disclosure.

The invention claimed is:

1. An electronic device, comprising:
a body, wherein the body has a first installation space; and
a functional module, wherein:
the functional module comprises a functional component and a drive apparatus,
the drive apparatus is connected to the functional component,
the drive apparatus comprises an output shaft,
the output shaft is connected to a first limiting portion, and
the output shaft drives the first limiting portion to rotate between a first position and a second position, wherein:
a second limiting portion is disposed in the first installation space,
in a case that the first limiting portion is in the first position, the first limiting portion is fitted with the second limiting portion to restrict detachment of the functional module from the first installation space, and
in a case that the first limiting portion is in the second position, fitting between the first limiting portion and the second limiting portion is released, and the functional module can be detached from the body,
wherein:
one of the first limiting portion or the second limiting portion comprises a fitting portion and the other comprises a card slot, and
in a case that the first limiting portion is in the first position, at least a part of the fitting portion is clamped into the card slot and is in limiting fitting with the card slot.

2. The electronic device according to claim 1, comprising a plurality of first limiting portions and a plurality of second limiting portions, wherein:
the plurality of first limiting portions are disposed at intervals in a circumferential direction of the output shaft,
the plurality of second limiting portions are disposed at intervals in the first installation space,
the plurality of first limiting portions are in a one-to-one correspondence with the plurality of second limiting portions, and
in a case that the first limiting portions are in the first position, each first limiting portion is in limiting fitting with one corresponding second limiting portion.

3. The electronic device according to claim 2, wherein a limiting gap is formed between two adjacent second limiting portions, and
the functional module further comprises a limiting base, wherein:
the limiting base is in rotation fitting with the output shaft,
the limiting base comprises a limiting convex portion, and
in a case that the first limiting portion is in the first position, the limiting convex portion is located in the limiting gap, and the limiting convex portion is fitted with the second limiting portion to limit in the circumferential direction of the output shaft.

4. The electronic device according to claim 3, wherein:
an accommodating space is disposed in the limiting convex portion,
a perforation or a through groove connected to the accommodating space is disposed in the limiting convex portion,
at least a part of the first limiting portion is located in the accommodating space and may be protruded out of the accommodating space through the perforation or the through groove, and
in a case that the first limiting portion is in the first position, a part of the first limiting portion penetrates through the perforation or the through groove and is fitted with the second limiting portion.

5. The electronic device according to claim 1, wherein:
the body comprises a power supply,
the functional module comprises a charging battery, and
in a case that the first limiting portion is in the first position, the fitting portion is communicated with a structure having the card slot, to be electrically connected to the power supply and the charging battery.

6. The electronic device according to claim 1, wherein:
the first limiting portion comprises the fitting portion and a connection portion,
the fitting portion extends in a circumferential direction of the output shaft,
the fitting portion and the output shaft are disposed at intervals in a radial direction of the output shaft,
the fitting portion is connected to the output shaft through the connection portion, and
in a case that the first limiting portion is in the first position, the fitting portion is fitted with the second limiting portion to restrict detachment of the functional module from the first installation space.

7. The electronic device according to claim 6, wherein:
the connection portion extends in the radial direction of the output shaft,
the first limiting portion further comprises a connection post,
the connection post extends in an axial direction of the output shaft,
the fitting portion is located on one side that is of the connection portion and that is away from the functional component, and
the fitting portion is connected to the connection portion through the connection post.

8. The electronic device according to claim 1, wherein:
the output shaft is a threaded shaft,
the output shaft is connected to the first limiting portion through a threaded sleeve rod,
the threaded sleeve rod is sleeved on the output shaft and is in threaded fitting with the output shaft,
the first limiting portion is connected to the threaded sleeve rod,
the body comprises a first opening connected to the first installation space, and
in a case that the first limiting portion is in the first position, the functional component may move with rotation of the output shaft, so that at least a part of the functional component is protruded out of the first installation space through the first opening.

9. The electronic device according to claim 8, wherein a guide protrusion is disposed on one of an inner wall of the first installation space or the functional component, and a guide groove is disposed on the other, wherein both the guide protrusion and the guide groove extend in an axial direction of the output shaft, and the guide protrusion is fitted into the guide groove to limit rotation of the functional component in a circumferential direction of the output shaft.

10. The electronic device according to claim 9, wherein the guide protrusion is located in the first installation space, and a preset spacing is provided between the guide protrusion and the first opening in the axial direction of the output shaft.

11. The electronic device according to claim 1, wherein the functional component comprises a second installation space and a second opening connected to the second installation space, and a drive body of the drive apparatus is installed in the second installation space.

12. The electronic device according to claim 1, wherein:
the functional component is an optical component,
the body comprises a rear cover and a display screen,
the rear cover is disposed opposite to the display screen,
the rear cover comprises a translucent structure, and
in a case that the first limiting portion is in the first position, the functional component faces the translucent structure.

13. The electronic device according to claim 1, wherein:
the functional module comprises a charging battery, the body comprises a wireless charging coil, and in a case that the first limiting portion is in the first position, the charging battery is fitted with the wireless charging coil to implement charging;
or
the functional module comprises a charging battery and a first charging contact, the first charging contact is electrically connected to the charging battery, a second charging contact is disposed in the first installation space, and in a case that the first limiting portion is in the first position, the first charging contact is in electrical contact with the second charging contact;
or
the functional module comprises a charging battery, a charging connector is disposed in one of the first installation space or the functional module and a charging interface is disposed in the other, and in a case that the first limiting portion is in the first position, the charging connector is plugged and electrically connected to the charging interface.

14. The electronic device according to claim 1, wherein the functional component comprises at least one of a camera, a fill light, a telephone receiver, a sensor, or a fingerprint recognition module.

15. A functional module of an electronic device, wherein the electronic device comprises a body, wherein the body has a first installation space, wherein:
the functional module is adapted to be installed in the first installation space, and
the functional module comprises:
a functional component; and
a drive apparatus, wherein:
the drive apparatus is connected to the functional component,
the drive apparatus comprises an output shaft,
the output shaft is connected to a first limiting portion, and
the output shaft drives the first limiting portion to rotate between a first position and a second position,
wherein:
a second limiting portion is disposed in the first installation space,
in a case that the first limiting portion is in the first position, the first limiting portion is fitted with the second limiting portion to restrict detachment of the functional module from the first installation space, and
in a case that the first limiting portion is in the second position, fitting between the first limiting portion and the second limiting portion is released, and the functional module can be detached from the body,
wherein:
one of the first limiting portion or the second limiting portion comprises a fitting portion and the other comprises a card slot, and
in a case that the first limiting portion is in the first position, at least a part of the fitting portion is clamped into the card slot and is in limiting fitting with the card slot.

* * * * *